United States Patent
Grimm et al.

(10) Patent No.: US 8,636,316 B2
(45) Date of Patent: Jan. 28, 2014

(54) COVER FOR A SLIDING ROOF SYSTEM

(75) Inventors: Rainer Grimm, Frankfurt (DE);
Claudia Riess, Lichtenberg (DE); Horst Boehm, Frankfurt (DE); Juergen Schrader, Weil Im Schoenbuch (DE)

(73) Assignee: Roof Systems Germany GmbH (DE)

( * ) Notice: Subject to any disclaimer, the term of this patent is extended or adjusted under 35 U.S.C. 154(b) by 45 days.

(21) Appl. No.: 13/371,757

(22) Filed: Feb. 13, 2012

(65) Prior Publication Data

US 2012/0217770 A1 Aug. 30, 2012

(30) Foreign Application Priority Data

Feb. 14, 2011 (EP) .................................... 11001193

(51) Int. Cl.
*B60J 7/047* (2006.01)

(52) U.S. Cl.
USPC ................................. 296/216.03; 296/216.05

(58) Field of Classification Search
USPC ............................ 296/216.02–216.05, 220.01
See application file for complete search history.

(56) References Cited

U.S. PATENT DOCUMENTS

| | | | |
|---|---|---|---|
| 3,507,537 A | | 4/1970 | Kouth et al. |
| 4,678,228 A | * | 7/1987 | Boots ....................... 296/216.03 |
| 5,238,290 A | | 8/1993 | Farmont |
| 6,540,289 B2 | * | 4/2003 | Bergmiller et al. ...... 296/216.09 |
| 2002/0126056 A1 | | 9/2002 | Zinsmeister et al. |
| 2005/0110307 A1 | | 5/2005 | Grimm et al. |

FOREIGN PATENT DOCUMENTS

| | | | |
|---|---|---|---|
| DE | 4108195 C1 | | 4/1992 |
| DE | 10326433 B3 | | 2/2005 |
| DE | 102006027877 A1 | | 12/2007 |
| DE | 102006050851 | * | 4/2008 |
| EP | 0437283 A1 | | 7/1991 |
| EP | 1238841 A2 | | 9/2002 |
| EP | 1533159 A1 | | 5/2005 |
| JP | 61160319 A | | 7/1986 |
| NL | 6 814 715 A | | 10/1968 |

OTHER PUBLICATIONS

European Search Report dated Aug. 16, 2011 for Application No. 11001193.9-1268.

* cited by examiner

*Primary Examiner* — Dennis Pedder
(74) *Attorney, Agent, or Firm* — Cantor Colburn LLP

(57) ABSTRACT

A cover for a sliding roof system comprises at least one reinforcing element which has a U-shaped cross-section and has its center leg attached to the cover such that the two side legs extend away from the cover. A sliding roof system provided with a cover of this type is distinguished in that it comprises a sliding/tilting mechanism including a fold-out sliding piece, the sliding piece being movably arranged on the guide rail.

19 Claims, 2 Drawing Sheets

COVER FOR A SLIDING ROOF SYSTEM

CROSS REFERENCE TO RELATED APPLICATIONS

This application claims the benefit of European Patent Application No. 11 001 193.9 filed Feb. 14, 2011, the contents of which are incorporated herein by reference thereto.

BACKGROUND

The invention relates to a cover for a sliding roof system.

Sliding roof systems for motor vehicles are well known. They comprise at least one cover which closes an opening in the vehicle roof in the closed state. Usually, a sliding/tilting mechanism is provided by which the cover can be moved from the closed position to a more or less open position.

One example of a cover of such a sliding roof system can be found in DE 102 13 994 A1 and U.S. Pat. No. 6,942,287, the contents each of which are incorporated herein by reference thereto. Attached on the cover is a connecting link part 25 which is movable in a sliding piece which is part of the sliding/tilting mechanism. The connecting link part has a Z-shaped cross-section, with one leg of the connecting link part being applied on the cover by means of a foam application.

The disadvantage of the known cover is that the connecting link part introduces bending moments into the cover due to its geometric shape.

It is the object of the invention to provide a cover for a sliding roof system which is distinguished by a high rigidity, low bending loads and a small installation space in vertical direction.

SUMMARY OF THE INVENTION

In order to solve this problem, a cover for a sliding roof system is provided according to the invention which comprises at least one reinforcing element which has a U-shaped cross-section and has its center leg attached to the cover such that the two side legs extend away from the cover. The U-shaped reinforcing element results in a significant increase in the rigidity of the cover without the need of a large installation space in vertical direction.

The reinforcing element can be glued to the cover and/or embedded in a foamed part which is attached to the cover. In this way, the necessary mechanical connection can be achieved with low expenditure.

It is preferred that the reinforcing element is a profiled rail. Such a rail is available at low cost.

According to a preferred embodiment, a guide rail is provided on the reinforcing element. This results in a compact construction, on the one hand, and in a very high stability on the other hand, since the forces acting between the guide rail and the cover are directly absorbed by the reinforcing element.

According to one embodiment, provision is made that the guide rail is integrated in the reinforcing element. This allows a reduction of the number of the required individual parts. Moreover, the expenditure for mounting the guide rail to the reinforcing element can be dispensed with. The guide rail may be formed by suitably shaped and aligned guide webs, for instance, which are integrally attached to the side legs of the reinforcing element.

According to an alternative embodiment provision is made that the guide rail comprises a base part with which it is attached to the reinforcing element, and two cranked guide webs. This allows an arrangement of the guide rail in the interior of the reinforcing element, resulting in a compact construction.

In doing so, it is of advantage if the cranked guide webs extend in opposite directions. This allows guiding a sliding piece of the sliding/tilting mechanism in transverse direction on the guide rail without any additional expenditure. In combination with a preferably symmetric cross-section, this has the effect that the guide rail does not introduce any bending moments into the cover.

The guide rail can be connected to the reinforcing element in various ways, for instance by means of a material bond, in particular glued, welded or soldered, or also in a mechanical fashion, in particular by means of a screw, clinch or tox connection.

For solving the above problem, a sliding roof system comprising a cover, a reinforcing element and a guide rail is also provided, with the sliding roof system including a sliding/tilting mechanism which comprises a fold-out sliding piece, the latter being movably arranged on the guide rail. The nested arrangement of guide rail and reinforcing element results in low bending loads in the cover, on the one hand, and to a very compact construction in vertical direction on the other hand.

BRIEF DESCRIPTION OF THE DRAWINGS

The invention will be explained in the following on the basis of an embodiment which is illustrated in the attached drawings in which.

DETAILED DESCRIPTION

Figure 1:
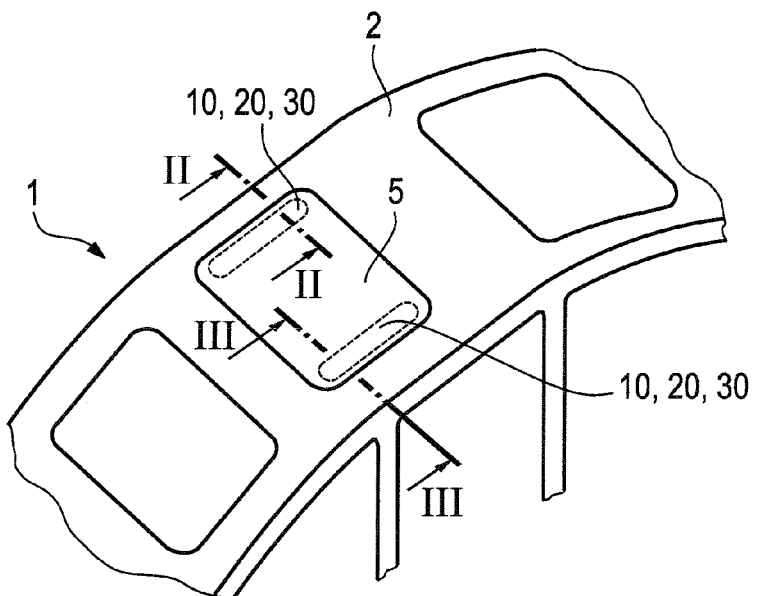
FIG. 1 schematically shows a motor vehicle comprising a sliding roof system.

FIG. 1 schematically shows a motor vehicle 1 comprising a vehicle roof 2 which is provided with a sliding roof system. From this sliding roof system, in particular a cover 5 can be seen in FIG. 1, which can be shifted to the rear by means of a sliding/tilting mechanism from the closed position shown in FIG. 1 so that a roof opening in the roof 2 is exposed to a greater or lesser extent. The cover 5 may be made of plastic or glass.

The sliding/tilting mechanism comprises two roof rails 10 extending in the longitudinal direction along the side beams of the vehicle roof The roof rails 10 receive various components by which the cover 5 can be moved to the closed position or to several open positions. A part of the sliding/tilting mechanism is represented by a sliding piece 12 (see FIG. 3) movably engaging a guide rail 20. The guide rail 20 preferably consists of metal and has an essentially symmetric cross-section with a base part 22 and two cranked guide webs 24. The guide webs extend in mutually opposite directions starting from the base part.

The sliding piece 12 encloses the guide webs on their outer side so that the sliding piece is reliably held on the guide rail perpendicular to the shifting direction.

The guide rail 20 is arranged in the interior of a U-shaped reinforcing element 30 which likewise is preferably made of metal and is realized as a profile part. The reinforcing element 30 comprises a center leg 32 facing the cover and attached thereto, as well as two side legs 34. The reinforcing element

Figure 2:
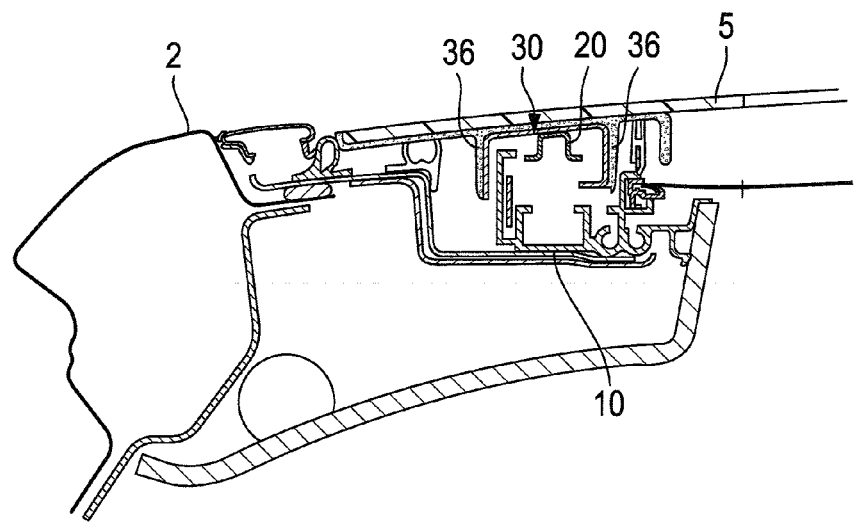
FIG. 2 schematically shows a cross-section along plane II-II of FIG. 1.
Figure 3:
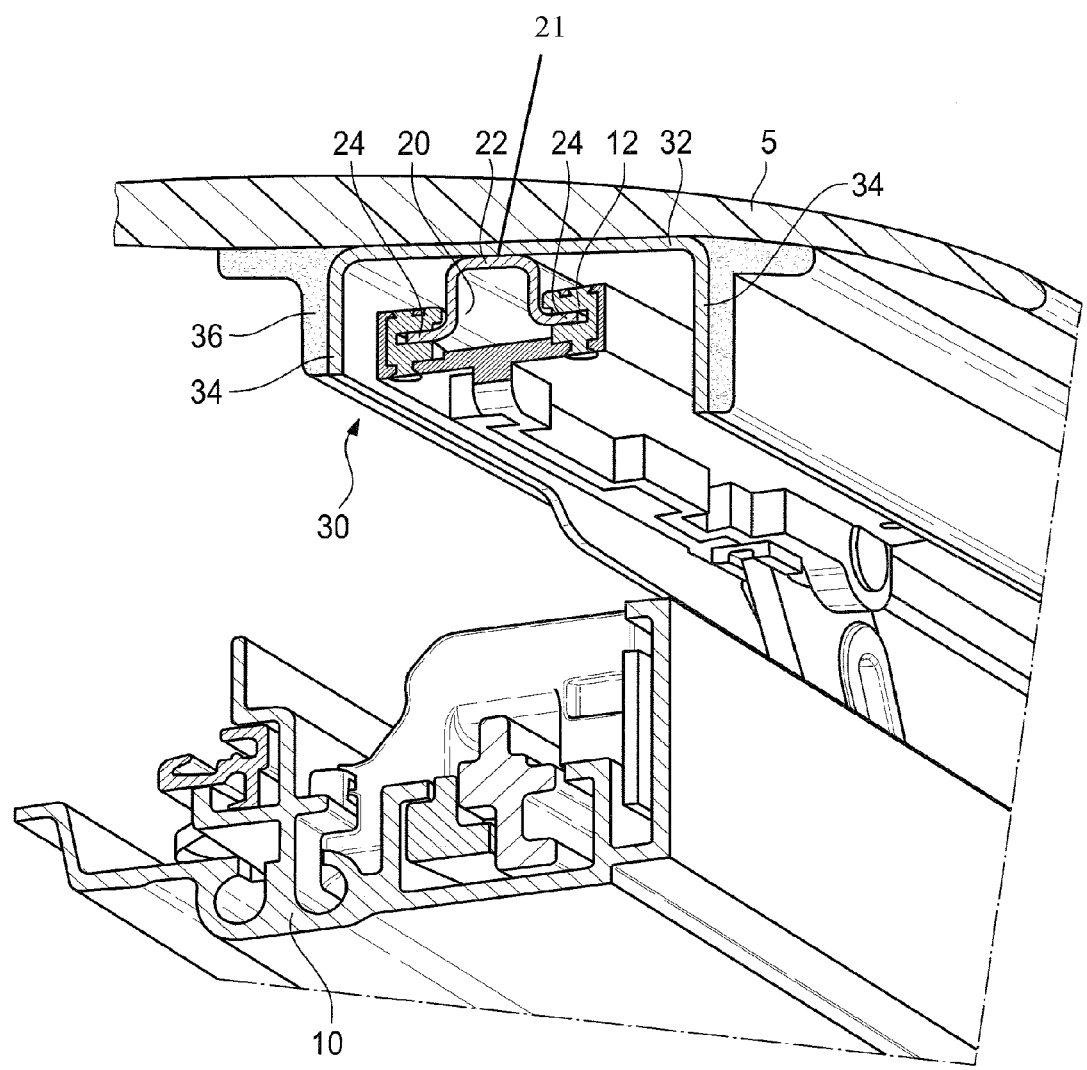
FIG. 3 schematically shows a cross-section along plane III-III of FIG. 1, with the cover being in a partially raised position.

30 is attached to the cover 5 by gluing and/or embedding it in foam (see a PU foam 36 indicated in FIGS. 2 and 3).

Here, the term "U-shaped" only refers to the basic shape defined by the center leg and the side legs. Further webs etc. may be provided on the side legs (see also in FIG. 2: an additional web arranged on the right-hand side leg); according to an embodiment which is not illustrated, these webs may also perform the function of the guide rail.

In order to connect the guide rail 20 to the reinforcing element 30, the base part 22 of the guide rail 20 may be glued, welded or soldered to the center leg 32 of the reinforcing element 30. It is also possible, however, to mechanically connect the two parts to each other, in particular by means of a screw, clinch or tox connection. The aforementioned connections are illustrated schematically by reference numeral 21 in FIG. 3.

The fact that the guide rail 20 is arranged in the interior of the cross-section of the reinforcing element 30 results in a very compact construction which is additionally distinguished in that the sliding piece 12 does not introduce any bending moments into the cover 5. Furthermore, a very compact construction is achieved in vertical direction so that a large headroom is ensured in the interior of the vehicle.

Although FIGS. 2 and 3 each showing only one reinforcing element with one guide rail, it goes without saying that in accordance with the roof rails 10 the cover 5 may be provided with two reinforcing elements 30 and two guide rails 20 extending in longitudinal direction in the proximity of the longitudinal edges of the cover 5 (see also FIG. 1).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cover for a sliding roof system, comprising:
    at least one reinforcing element having a U-shaped cross-section comprising a center leg and two side legs extending therefrom, wherein the center leg is attached to the cover such that the two side legs extend away from the cover, wherein a guide rail is provided on the at least one reinforcing element and wherein a base part of the guide rail is attached to the center leg of the at least one reinforcing element such that the guide rail is spaced from the two side legs of the at least one reinforcing element.

2. The cover as in claim 1, wherein the reinforcing element is glued to the cover.

3. The cover as in claim 2, wherein the reinforcing element is embedded in a foamed part that is attached to the cover.

4. The cover as in claim 3, wherein the foamed part is a frame.

5. The cover as in claim 3, wherein the reinforcing element is a rail.

6. The cover as in claim 1, wherein the reinforcing element is embedded in a foamed part that is attached to the cover.

7. The cover as in claim 1, wherein the reinforcing element is a rail.

8. The cover as in claim 1, wherein the guide rail further comprises two cranked guide webs attached to the base part.

9. The cover as in claim 8, wherein the cranked guide webs extend in opposite directions.

10. The cover as in claim 9, wherein the guide rail is connected to the reinforcing element by a material bond, selected from the group comprising glue, welds or solders.

11. The cover as in claim 8, wherein the guide rail is mechanically connected to the reinforcing element comprising anyone of the following: screw, clinch or TOX connection.

12. The cover as in claim 5, wherein the cover is made of glass.

13. The cover as in claim 5, wherein the cover is made of plastic.

14. The cover as in claim 9, wherein the cover is made of glass and wherein the reinforcing element is embedded in a foamed part that is attached to the cover and the reinforcing element is a rail.

15. The cover as in claim 1, wherein the cover is made of glass and wherein the reinforcing element is embedded in a foamed part that is attached to the cover and the reinforcing element is a rail.

16. A sliding roof system, comprising:
    a cover, comprising:
        at least one reinforcing element having a U-shaped cross-section comprising a center leg and two side legs extending therefrom, wherein the center leg is attached to the cover such that the two side legs extend away from the cover wherein a guide rail is provided on the at least one reinforcing element and wherein a base part of the guide rail is attached to the center leg of the at least one reinforcing element such that the guide rail is spaced from the two side legs of the at least one reinforcing element; and
    a sliding/tilting mechanism having a fold-out sliding piece, the fold-out sliding piece being movably arranged on the guide rail.

17. The sliding roof system as in claim 16, wherein the cover is made of glass and wherein the at least one reinforcing element is embedded in a foamed part that is attached to the cover and the reinforcing element is a rail.

18. The cover as in claim 1, wherein the guide rail further comprises a pair of guide webs each extending away from the base portion of the guide rail in opposite directions.

19. The cover as in claim 18, further comprising a sliding piece of a sliding/tilting mechanism, wherein the sliding piece is configured to movably engage the pair of guide webs of the guide rail.

* * * * *